United States Patent

[11] 3,588,695

| [72] | Inventors | Blase J. Furfaro<br>Berkey;<br>Donald F. Wilhelm, Toledo, Ohio |
|---|---|---|
| [21] | Appl. No. | 686,373 |
| [22] | Filed | Nov. 13, 1967 |
| [45] | Patented | June 28, 1971 |
| [73] | Assignee | Helm Instrument Company, Inc.<br>Toledo, Ohio |

[54] CONDITION MONITORING APPARATUS
9 Claims, 1 Drawing Fig.

[52] U.S. Cl. .................................................. 324/111,
324/74, 324/119
[51] Int. Cl. ................................................. G01r 1/00,
G01r 19/22
[50] Field of Search.......................................... 324/119,
103, 111, 74, 123, 65

[56] References Cited
UNITED STATES PATENTS

| 2,924,769 | 2/1960 | Harriman et al.............. | 324/103X |
| 2,585,121 | 2/1952 | Hartman........................ | 324/65X |
| 2,806,208 | 9/1957 | Giuffrida....................... | 324/123 |
| 3,054,951 | 9/1962 | Richard......................... | 324/111X |
| 3,193,803 | 7/1965 | Hoffman........................ | 324/111X |
| 3,237,097 | 2/1966 | Santis........................... | 324/74X |
| 3,360,727 | 12/1967 | Justice........................... | 324/123 |

Primary Examiner—Rudolph V. Rolinec
Assistant Examiner—Ernest F. Karlsen
Attorney—Myron E. Click ABSTRACT: Monitoring apparatus shown in a preferred embodiment as including an input circuit for separating AC and DC components of a signal, a circuit for conditioning the AC component and translating it to DC output signal which is proportional to the peak-to-peak value of the AC component, and various readout means. Means for calibrating the circuit and readouts, and means for limiting transient effects are also disclosed. The preferred embodiment has four modes of operation—actual monitoring, transducer displacement measuring, calibration and testing.

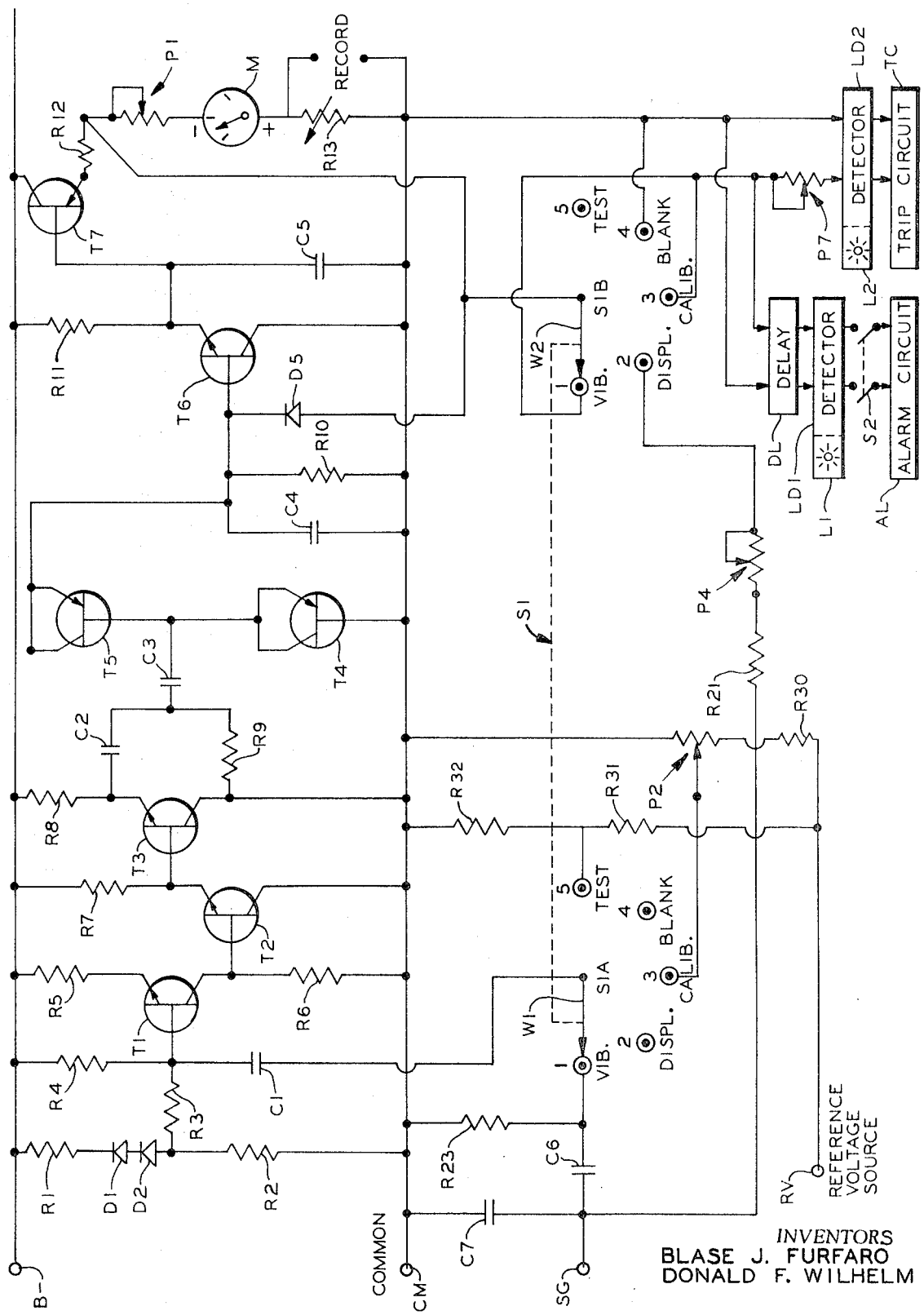

CONDITION MONITORING APPARATUS

The invention relates broadly to condition monitoring apparatus and particularly to improved monitoring means for providing very accurate and linear readings required in delicate control operations.

While the invention is described with reference to vibration monitoring it should be noted that the circuits herein are applicable to monitoring other conditions such as temperature, pressure, speed, etc. Since the apparatus is particularly useful in vibration monitoring applications it will be described with reference to the utilization of the type of signal generated by a mechanism for sensing vibration of a shaft, in order to point out more clearly the advantages and improvements herein.

In detecting the vibration of certain structural elements or units, as for illustration a rotary shaft supporting a load such as a machine component, equipment is provided for detecting the vibration of the shaft by variation in voltage signal from a pickup or sensing device, employed as part of a detection system arranged adjacent the shaft. In the pickup described herein the mounting is accomplished adjacent the shaft subject to vibration. With the shaft at rest, the pickup operates to transmit a reference signal having a particular voltage characteristic. As the shaft rotates and vibration is encountered, the voltage characteristics varies in accordance with the amplitude of vibration. The amplitude of vibration in this instance means the distance from a point representing the centerline of the shaft at rest, the shaft moving under the influence of forces created by vibration.

It is an object of this invention to provide improved monitoring apparatus for converting an AC input signal to a calibrated DC output signal for use with indicator devices. The apparatus further provides a fixed or an adjustable output for recording devices. The DC output signal may be utilized to drive a relay or other type of level detection means. A calibrated signal is generated to indicate displacement of the sensing mechanism from the shaft being monitored. A stable test signal is provided to test the entire circuit for converting and conditioning the AC input signal to a DC output signal. Adjustable means are provided for generating calibration signals to set level detection means and to control the ratio of input signal to output signal of the conditioning circuit. A switching means is provided to select any one of the four modes of operation disclosed hereinafter.

It is another object of this invention to provide an improved monitoring apparatus for use in control operations.

In providing the above objects the monitoring apparatus of this invention features input circuit means for receiving an input signal having an AC component proportional to a condition being monitored and passing only AC components of the input signal. Conditioning circuit means for receiving the AC input signal includes circuit means for rectifying the AC signal to a DC signal proportional to the peak-to-peak value of the AC signal. Output circuit means indicate the magnitude of the output signal. The conditioning circuit means may include ripple filter means having a capacitor therein connected to the rectifying means to provide a ripple free DC signal output. Means are provided for selectively discharging the ripple filter capacitor means to prevent transient signals from appearing in the DC signal output and giving a false indication of the magnitude of the condition being monitored.

Means for calibrating the conditioning circuit means includes means for adjusting the magnitude of the output signal to a predetermined ratio with respect to the magnitude of the input signal. Advantageously, the output circuit means includes a plurality of means for reading out the output signal, the calibrating means including means for adjusting the magnitude of the output signal presented to a first readout means with respect to the magnitude of output signal presented to a second readout means.

The conditioning circuit means includes means for filtering transients out of the DC signal output. Further, means are provided for limiting unwanted high frequency parasitics in the AC input signal to the conditioning circuit means. Coupling means are provided for filtering direct current out of the raw input signal to the conditioning circuit means.

The conditioning circuit means advantageously includes a temperature-compensated voltage amplifier input stage having a fixed and known bias to provide a stable amplification of the AC input signal. The conditioning circuit means further includes a current amplifier stage connected to the input stage to amplify the AC input signal.

The apparatus may further include test circuit means for providing a known reference signal. Means for selectively connecting the test circuit to, while disconnecting the input circuit from, a conditioning means are shown in the form of a selector switch. Means for automatically discharging the capacitor in the ripple filter means while reconnecting the input circuit to, and disconnecting the test circuit, from the conditioning circuit means are shown. Level detector means connected to receive the output signal may be disconnected from the output signal, when the test circuit is connected to the conditioning circuit, to prevent a false detection. Detector calibration circuit means for supplying an adjustable detector calibration signal may be selectively connected to the conditioning circuit means while the input circuit is disconnected therefrom. The selective connection means is operative to prevent the application of both the test and calibration circuits to the conditioning circuit at the same time. The level detection means may constitute a plurality of level detectors, each detector having means for adjusting the magnitude of output signal applied to the level detector. The level detectors may have first and second detector indicator means, actuatable in response to the detection of a predetermined signal by the level detector. Means for selectively disabling at least one of the indicator means prevents actuation thereof while the level detector is being calibrated. Delay circuit means may be inserted between the output signal and the level detector to prevent transient signals from causing a false detection.

Other objects, advantages and features of the present invention will become readily apparent when the following description is taken in conjunction with the accompanying drawing.

Referring to the drawing there is illustrated monitoring apparatus embodying the teachings of this invention, laid out in schematic and diagrammatic form.

Devices for detecting the vibration of a rotary shaft by determining variation from a predetermined signal emitted by a pickup device placed adjacent the shaft are known. Heretofore devices for vibration detection have been employed to transmit an electric signal to a readout device such as an oscilloscope, permitting an observer to determine by continual inspection of an oscilloscope the degree of vibration detected by the device.

In equipment such as gas compressors where a prime mover is connected to a rotary shaft mounting a plurality of impellers for compressing gas, it is important to know the exact amount of vibration to which the shaft is subjected under all operating conditions, preferably, without the service of an attendant such as would be necessary with an oscilloscope. For example, under certain circumstances a shaft vibration resulting in shaft displacement on the order of 5 to 6 mils may be within an acceptable limit for safety while a shaft vibration resulting in shaft displacement in excess of 12 mils would be an unsafe condition as far as the possibility of the destruction of the machine through excessive vibratory forces is concerned.

With an oscilloscope as a readout device it is impossible to determine with any degree of accuracy the specific magnitude of vibration without an operator in attendance. Thus, a vibration monitoring system was introduced to the art in U.S. Pat. No. 3,316,756, issued May 2, 1967, utilizing vacuum tube circuitry and meter contact relays to provide mechanism which first issues a warning concerning the amplitude of shaft movement and second an actual trip signal at which time the machine operation was terminated. Other examples of vibration monitoring devices are illustrated in U.S. Pat. No. 3,201,776, issued Aug. 17, 1965; U.S. Pat. No. 2,796,756, issued June 25, 1957; and U.S. Pat. No. 2,799,015, issued July 9, 1957.

While the above devices may have been suitable at the time of their initial use with a particular application, demands for sophistication in instrumentation including increased accuracy, flexibility, reliability, and less maintenance has led to a requirement for new condition monitoring apparatus. Translation of existing or disclosed vacuum tube circuits to solid state circuits was unsatisfactory, because new functions were required along with a greater linearity and accuracy. In formulating new circuits additional problems, such as those involving transients, were encountered and had to be solved. There is thus described hereinafter novel and improved condition monitoring apparatus which is particularly applicable for use in vibration monitoring.

The mechanism for detecting vibration of a shaft does not form a part of this invention which is directed to the objects set forth hereinbefore. Vibration detection mechanism, for use with the apparatus herein may be commercially obtained, for example, from the Bentley Nevada Corporation, an organization that markets a vibration detection pickup. In the interests of clarity, however, a brief description of the vibration detecting pickup, of the kind with which the measuring and monitoring system forming this invention has been successfully applied, follows. This vibration detection pickup includes a sensing head which may be placed about 25 to 30 mils from a shaft subject to vibration, an oscillator and a detector. By means of the oscillator in the detector a three to four megacycle signal is fed to the sensing head. Vibration of a shaft varies a reactance of the head, modulating the signal in accordance with a change in the reactance. The resultant signal is fed to a diode-detector which removes the RF component and presents the low frequency component as an output. In addition, a DC signal which is a measure of the distance between the pickup head and the element being monitored is generated. It is this combination signal that is presented to the condition monitoring apparatus forming this invention. The signal is received at terminal SG on the left-hand side of the drawing. The capacitor C7 connected between the signal terminal SG and common or ground terminal CM, along with the capacitor C6-resistor R23 combination forms an input circuit.

A switch S1 having sections S1A and S1B has wipers W1 and W2 ganged together. Each section of the switch has five positions which are numbered 1 through 5 on the drawing. The switch S1 affords a means for selectively connecting the various circuits described herein to provide the mode of operation desired.

Circuit means for conditioning the signals received from the input circuit generally occupy the upper half of the drawing and are connected between the common terminal CM and a power supply terminal B−. The conditioning circuit means includes a temperature compensated input stage amplifier, a current amplifier stage, a rectifying and ripple removing stage, and an output amplification stage. The temperature-compensated amplifier input stage includes transistor T1 having emitter and collector electrodes connected in an output circuit with resistors R5 and R6 A circuit for providing a fixed bias to the control electrode of transistor T1 includes resistors R2, R3, R4 and input capacitor C1. Temperature compensation is afforded by diodes D1, D2 and resistor R1.

The current amplifying stage includes a first transistor T2 having its control electrode connected to the output of transistor T1. The emitter and collector electrodes of transistor T2 are connected in an output circuit with resistor R7. Transistor T3 completes the current amplifier stage and has a control electrode connected to the output of transistor T2. The emitter and collector electrodes of transistor T3 are connected with resistor R8 in an output circuit. Capacitor C2 and resistor R9 are connected in series across the emitter and collector electrodes of transistor T3 and, in conjunction with capacitor C3, remove the direct current bias added to the conditioning circuit at the input of transistor T1 and couple the AC output of transistor T3 to the rectifier stage.

Transistors T4 and T5 are connected as diodes to rectify the signal received from the C2, R9, C3 network. Capacitor C4 and resistor R10 are connected to the output of the rectifier stage to provide a ripple filter to remove the ripple from the direct current output from the rectifier stage.

The output signal amplifying stage includes transistor T6 having a control electrode connected to receive the DC signal from the ripple filter circuit and having emitter and collector electrodes connected in an output circuit with resistor R11. Transistor T7 completes the output amplifier stage and has a control electrode connected to the output of transistor T6, and has emitter and collector electrodes connected in a output circuit with a current limiting resistor R12.

Several types of readout means or indicator means are disclosed to be driven from the output furnished by the output amplifying stage. A meter M is connected in circuit with a potentiometer P1 and a recording readout resistor R13. The meter M indicates visually the magnitude at any particular moment of the output signal from the conditioning circuit. Permanent records may be obtained by connecting a recording device to the terminals on each side of resistor R13. The resistor R13 may be made adjustable to provide an adjustable output for directly driving a particular recording device.

An additional readout means is illustrated in level detector LD1 which is operative to illuminate lamp L1 or alarm circuit AL when a predetermined level of signal is detected in the detector LD1.

Still another readout means is illustrated by the provision of level detector LD2 which usually is utilized to detect a signal level higher than that detected by unit LD1 to, in turn, actuate a trip circuit TC and a lamp L2. Trip circuits are known in the prior art and are generally connected to interrupt operation of the machine which is being monitored, when a vibration level gets too high or when another condition exceeds safety limits.

A delay circuit DL, although shown only incorporated in circuit with detector LD1, may be utilized with any readout means. The delay circuit DL is operative to delay the application of a signal received thereby to a detector or other circuit so that a transient will not effect a false actuation of a detector or other circuit.

A potentiometer P7 is shown in circuit with the output signal being delivered to detector LD2, although it may be utilized in circuit with any other or all of the readout means to adjust the magnitude of the signal being applied to the circuit with respect to the magnitude being applied to any other circuit or as an individual calibration means.

In operation the signal received at input terminal SG from a pickup device includes both an AC component which is a measure of the vibration of the shaft and a DC component which is a measure of or proportional to the distance of the pickup head from the element being monitored. Capacitor C7 in the input circuit eliminates unwanted high frequencies and parasitics that may be received from the pickup or transducer. The filter, including capacitor C6 and resistor R23, function to remove the DC component from the input signal received at terminal SG.

When switch S1 is set so that wipers W1 and W2 are in position 1 the circuit is connected in the vibration detecting mode and operates as follows. The AC component of the input signal is transmitted through coupling capacitor C1 to the control electrode of transistor T1. For purposes of amplification the transistor T1 sees the AC input signal only, even though a DC level has been imposed again on the signal by the bias network connected to the control electrode of transistor T1. However, the bias network contributes only a known DC level which is later removed at the capacitor C2-resistor-capacitor C3, R9 network. This bias level is fixed and is thus distinguished from the DC component of the input signal SG which varies. If the varying DC component of the input signal at terminal SG was allowed to pass the input circuit, the bias level to the transistor T1 would change the known amplification and interfere with the accuracy desired in the circuit. The temperature-compensation network including diodes D1, D2 and resistor R1 in combination with the bias network reduces the possible gain from the input amplifier. However, the sacrifice in amplification is necessary to provide the stability required in an accurate and linear circuit of the type disclosed herein.

Transistors T2 and T3 are connected as emitter-follower current amplifiers with virtually no voltage gain. This provides a satisfactory amplification so that the signal emerges with a magnitude sufficient for further operation in the conditioning circuit means. The transistor T2, T3 combination provides a high impedance into the stage and a low impedance out of the current amplification stage. This reduces the criticality of the C2, R9, C3 network.

As noted hereinbefore, the network including capacitor C2 removes the direct current component of the signal inserted into the circuit by the bias network connected to the control electrode of transistor T1. The network also couples the AC component of the signal to the rectifying circuit of transistors T4 and T5. Capacitor C4 in conjunction with resistance R10 filters the ripple from the rectified signal and presents a substantially steady DC signal to the control electrode of the transistor T6. The transistor T6 and T7 in the output amplifying stage provide a sufficient gain so that the resultant DC output signal is of sufficient magnitude to drive indicating meters, recorders, relays, level detection circuits, etc. Capacitor C5 connected between the output circuit of transistor T6 and the control electrode of transistor T7 limits transients in the output stage of the conditioning circuit means to prevent a false indication of the magnitude of the vibration or other condition being monitored to the readout means.

The output signal may then be read on indicating meter M and/or recorded from adjustable resistor R13. The output signal is also directed through wiper W2 of section S1B of switching means S1 through position 1 contact to level detectors LD1 and LD2, the functions and operation of which have been set forth hereinbefore. Potentiometer P1 connected in circuit with meter M and recording resistors R13 may be utilized to calibrate the ratio of the magnitude of the output signal with respect to the magnitude of the input signal so that a known input signal will provide the correct reading on the output meter M. The dial of meter M may be calibrated either in electrical units or in physical displacement units.

When wipers W1 and W2 of switching means S1 are moved to position 2 of the switch the displacement of the pickup sensing head from the shaft is measured. The raw input signal is connected from input terminal SG through current limiting resistor R21, potentiometer P4, position 2 of section S1B of switch S1, potentiometer P1, meter M, and resistor R13. Potentiometer P4 may be utilized to calibrate the signal to the units inscribed on the dial of meter M. While the conditioning circuit means described hereinbefore enabled meter M to read a DC output signal which was proportional to the peak-to-peak value of the AC component of the input signal, the connection for the displacement measuring circuit enables the meter M to read the average value of the DC component of the signal received from input terminal SG. Since the AC component is very, very small with respect to the magnitude of the DC component of the input signal it will not be necessary in most circumstances to remove the AC component of the signal. The average value of the DC component read by meter M in the circuit shown will be very, very close to the actual DC value, particularly when the AC component riding on the DC component is a sine wave as in the present circumstances.

When the wipers W1 and W2 of switching means S1 are moved to position 3 the monitoring apparatus operates in a calibration mode. A reference voltage source is connected to terminal RV. The reference voltage source advantageously provides a precision amplitude square wave input to current limiting resistor R30 and potentiometer P2. The adjustable voltage from potentiometer P2 is applied through position 3 in section S1A, wiper W1, and capacitor C1 to the input of the conditioning circuit means. The calibration reference voltage therefore is applied to the entire conditioning circuit means so that the conditioning circuit measures peak-to-peak square wave input just as it does for vibration frequency or sine wave input. The calibration square wave is operated on in the same fashion as the vibration input signal by the conditioning circuit means and is then applied from the output of transistor T7 through wiper W2 of section S1B of switching means S1 to level detectors LD1 and LD2. An adjustable calibration signal is thus available to permit adjustment of the level detector units LD1 and LD2 so that each can respond at a predetermined magnitude of signal. Unit LD1, for example, may be set to detect a level of signal at which a visual alarm such as lamp L1 or an audible alarm such as alarm circuit AL should be actuated, but which is still within the safety limits of the machine and does not require interruption of a machine. Similarly, unit LD2 may be set to illuminate lamp L2 and to actuate the trip circuit TC when the signal indicates that the safety level of the machine is being surpassed. Potentiometers such as P7, as noted hereinbefore, may be supplied on the inputs of each of the level detector circuits to individually calibrate the detection levels thereof.

Switching means such as S2 may be provided between the level detector circuits and alarm, trip or other circuits actuatable by the level detectors so that the latter circuits may be disconnected during calibration to prevent accidental actuation thereof. Calibration may still be effected by observing the illumination of lamps L1, L2 as well as by measuring actual current or voltage levels within the detectors. The function of the calibration as just described is important since the conditioning circuit means must treat both the calibrating signal and the input signal the same way. This insures that the alarms, trips, etc. fire or are actuated when a predetermined signal level is reached. That is, peak-to-peak measurement of the AC input is utilized because it more accurately reflects the exact displacement of the shaft from the transducer. This covers all situations, whether the AC input is a pure sine wave or otherwise. It is then important to calibrate the monitoring apparatus by utilizing a calibration signal having a peak-to-peak value and by routing the calibration signal through the same circuit that receives, conditions and measures the AC component of the vibration or other signal.

When wipers W1 and W2 of switching means S1 are moved to position 5 the apparatus operates in the test mode. That is, a known reference voltage such as the precision square wave available at terminal RV is applied through precision resistors R31 and R-32 to position 5 of section S1A. The test voltage is set at a magnitude known to correspond to a predetermined position of displacement. The peak-to-peak value of the precision square wave is then conditioned and measured, the output signal appearing on meter M. Thus, it can be determined that the condition circuit means is operating satisfactorily in its entirety.

During testing of the conditioning circuits a charge is left on the capacitor C4 of the ripple filter. This is not desirable since it will provide a large transient when the switching means S1 is turned from position 5 to position 1. The transient may reach a magnitude to actuate either the alarm circuit or the trip circuit. Therefore, position 4 in section S1B of switching means S1 is connected to common or ground and a diode D5 is connected between wiper W2 and the side of condenser C4 opposite that connected to ground. Thus, as the switching means S1 is moved back toward position 1, it contacts position 4 and enables diode D5 to drain or short circuit the charge on capacitor C4 to remove the possibility of a transient of harmful magnitude in the circuit when it is switched to the normal operating mode in position 1. Capacitor C4 does not normally charge in a similar manner when the switching means S1 is in position 3, since after calibration the potentiometer P2 is returned to substantially zero output and the charge on capacitor C4 is accordingly reduced.

Thus capacitors C7, C6, C5, C3, C2 and C1 along with diode D5 are connected and utilized in the circuit illustrated to limit or remove transient effects which may interfere with the accuracy and operability of the monitoring apparatus described.

An improved condition monitoring apparatus has been described wherein novel functions are performed, and previously known functions are performed in an improved manner to add to the linearity, accuracy and reliability of the device. It is pointed out that while the illustrated example constitutes a practical embodiment of our invention, we do not limit our-

We claim:

1. Monitoring apparatus comprising input circuit means adapted to receive an AC input signal proportional to a condition being monitored; conditioning circuit means for receiving and rectifying said AC signal to a DC signal proportional to the peak to peak value of said AC signal; said conditioning circuit including ripple filter means having capacitor means connected to said rectifying means; output circuit means responsive to said DC signal for indicating the magnitude of the condition being monitored; circuit means for providing a known reference AC signal; means for selectively connecting said input circuit means and said reference signal circuit means to said conditioning circuit means; and means responsive to a transfer by said selective connecting means from a connection of said reference signal circuit means to a connection of said input circuit means to said conditioning circuit means for discharging said ripple filter capacitor means to prevent transient signals from appearing in said DC signal output which would give a false indication of the magnitude of said condition.

2. Apparatus as defined in claim 1 which further includes means for filtering transients not removed by said ripple capacitor discharge out of said DC signal output to prevent false indications of said condition.

3. Apparatus as defined in claim 1 which further includes means connected to said input circuit for limiting unwanted high frequency parasitics in said AC input signal to said conditioning circuit means.

4. Apparatus as defined in claim 1 in which said conditioning circuit means includes a temperature-compensated voltage amplifier input stage having a fixed and known bias to provide a stable amplification of said AC input signal.

5. Apparatus as defined in claim 4 in which said conditioning circuit means further includes a current amplifier stage connected to said input stage to amplify said AC input signal to a level which is easier to detect.

6. Apparatus as defined in claim 1 which further includes level detector means connected to receive said DC output signal, and means for disconnecting said level detector means from said DC output signal when said reference signal circuit means is connected to said conditioning circuit means to prevent a false level detection.

7. Apparatus as defined in claim 1 which further includes level detector means connected to receive said DC output signal; detector calibration circuit means connected to said known reference signal circuit means for supplying an adjustable detector calibration signal; said selective connecting means including means for selectively connecting said detector calibration circuit to, while disconnecting said input circuit from, said conditioning circuit means; and test circuit means connected to said reference signal circuit means; said selective connecting means further including means for selectively connecting said test circuit means to, while disconnecting said input circuit means from, said conditioning circuit means; said selective connecting means further including means for automatically preventing connecting of said test circuit means and said detector calibration circuit means to said conditioning circuit means at the same time.

8. Apparatus as defined in claim 7 which further includes first and second detector indicator means each actuatable in response to the detection of a predetermined signal by said level detector means, an means for selectively disabling at least one of said detector indicator means to prevent actuation thereof to permit calibration of said level detector means.

9. Apparatus as defined in claim 1 which further includes level detector means connected to receive said DC output signal and delay circuit means connected to delay application of said output signal to said level detector means to prevent transient signals from causing a false detection.